United States Patent
Chae et al.

(10) Patent No.: US 8,599,409 B2
(45) Date of Patent: Dec. 3, 2013

(54) PRINTING CONTROL APPARATUS, IMAGE FORMING APPARATUS, AND PRINTING CONTROL METHOD OF ANALYZING PRINTING OPTION FOR PRE-PROCESSING IN AN XPS FILE

(75) Inventors: Sung-won Chae, Seoul (KR); Yong-in Eom, Hwaseong-si (KR); Joo-duck Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 706 days.

(21) Appl. No.: 12/706,895

(22) Filed: Feb. 17, 2010

(65) Prior Publication Data

US 2011/0058204 A1  Mar. 10, 2011

(30) Foreign Application Priority Data

Sep. 8, 2009  (KR) .................. 10-2009-0084486

(51) Int. Cl.
    *G06F 3/12*  (2006.01)
(52) U.S. Cl.
    USPC ........................................ 358/1.15; 358/1.16
(58) Field of Classification Search
    USPC ................................................ 358/1.15–1.16
    See application file for complete search history.

(56) References Cited

U.S. PATENT DOCUMENTS

| | | | |
|---|---|---|---|
| 2008/0151294 A1* | 6/2008 | Natori et al. | 358/1.15 |
| 2008/0158581 A1* | 7/2008 | Ferlitsch | 358/1.13 |
| 2009/0217305 A1* | 8/2009 | Kato | 719/321 |
| 2009/0219550 A1* | 9/2009 | Levin et al. | 358/1.1 |
| 2009/0219576 A1* | 9/2009 | Akiyama et al. | 358/1.16 |
| 2009/0225362 A1* | 9/2009 | Akiyama et al. | 358/1.15 |
| 2009/0268236 A1* | 10/2009 | Miyata | 358/1.15 |

* cited by examiner

*Primary Examiner* — Benny Q Tieu
*Assistant Examiner* — Quyen V Ngo
(74) *Attorney, Agent, or Firm* — Stanzione & Kim, LLP

(57) ABSTRACT

A printing control apparatus is provided. The printing control apparatus includes a user interface to set a printing option for a document to be printed, an extraction unit to determine whether the set printing option is a printing option for pre-processing, a generation unit to generate a setting file corresponding to the pre-processing printing option if the printing option is the pre-processing printing option, a conversion unit to convert an XPS file into an enhanced XPS file that includes the generated setting file, and a controller to transmit the enhanced XPS file to the image forming apparatus.

20 Claims, 8 Drawing Sheets

@PJL JOB
@PJL COMMENT PRIVATE AND STORE PRINT
@PJL SET HOLD=STORE
@PJL SET HOLDTYPE=PRIVATE
@PJL SET HOLDKEY="1234"

PRINTING CONTROL APPARATUS, IMAGE FORMING APPARATUS, AND PRINTING CONTROL METHOD OF ANALYZING PRINTING OPTION FOR PRE-PROCESSING IN AN XPS FILE

CROSS-REFERENCE TO RELATED APPLICATIONS

This application claims priority under 35 U.S.C. §119 (a) from Korean Patent Application No. 10-2009-84486, filed on Sep. 8, 2009, in the Korean Intellectual Property Office, the disclosure of which is incorporated herein by reference in its entirety.

BACKGROUND

1. Field of the Invention

The present general inventive concept generally relates to machinery-implemented image forming such as through a printing control apparatus, an image forming apparatus, and a printing control method. More particularly, the present general inventive concept is directed to a printing control apparatus, an image forming apparatus, and a printing control method which are capable of speeding up processing of an extensible markup language (XML) paper specification (XPS) file by the image forming apparatus.

2. Description of the Related Art

As used herein, an image forming apparatus is an apparatus that renders printing data generated by a terminal device such as a computer and tangibly produces the rendered printing data on a recording medium. Examples of such an image forming apparatus include copiers, printers, facsimile machines, and multi-function peripherals (MFP) incorporating the functions of the aforementioned devices into a single device.

Certain image forming apparatuses are equipped with an XPS emulator so as to be able to print an XPS file. The same image forming apparatus may include an emulator to print data that are written in page description language (PDL) such as postscript (PS) and printer command language (PCL).

An XPS file is an electronic file in a predetermined and specified layout by which a document format can be maintained and can be shared with other devices. Additionally, the XPS file systemizes all resources necessary to describe a corresponding document or job in a directory structure and then combines the resources with data describing reference relationships among the resources using XML in a compressed data format such as the well-known ZIP format.

However, printing options for the XPS file are set within a data structure referred to as a "PrintTicket" of the XPS file making it difficult to perform pre-processing operations on the XPS document, such as those specified in PDL printing data.

When a document is printed by way of PDL printing data such as PS and PCL, one or more printer job language (PJL) commands are transmitted to an image forming apparatus before printing data are transmitted. In this way, the image forming apparatus is informed as to how the printing data are to be processed. On the other hand, when printing an XPS file, the image forming apparatus does not receive prior information as to how printing data are to be processed; it must first perform unzipping and/or parsing the XPS file. Therefore, there is a need for a method by which a printing option necessary for pre-processing an XPS file can be analyzed and applied prior to the onset of printing operations.

SUMMARY

The present general inventive concept provides an apparatus and concomitant methods by which pre-processing of certain structured data can occur.

Additional embodiments of the present general inventive concept will be set forth in part in the description which follows and, in part, will be obvious from the description, or may be learned by practice of the general inventive concept.

The foregoing and/or other features and utilities of the present general inventive concept may be achieved by a printing control apparatus that includes a user interface to set a printing option for a document to be printed, an extraction unit to determine whether the set printing option is a printing option for pre-processing, a generation unit to generate a setting file containing the pre-processing printing option if the printing option is the pre-processing printing option, a conversion unit to convert the XPS file to include the generated setting file, and a controller to transmit the converted XPS file to an image forming apparatus.

The image forming apparatus may receive the converted XPS file from the printing control apparatus, retrieve the setting file from the converted XPS file, and print the XPS file.

The image forming apparatus may apply the printing option contained in the setting file to the contents of the XPS file and print the XPS file.

The converted XPS file may be a compressed file and the setting file may be located within the converted XPS file.

The setting file may include a PJL command.

The pre-processing printing option may be at least one of printing options "Banner Page Printing", "Separator Print", "JobStore", "Confirm Print", "Secure Print", "Private JobStore", "Common JobStore", and "Reserve Print".

The pre-processing printing option may be performed by the image forming apparatus prior to a parsing operation for the XPS file.

The controller may change the setting file within the converted XPS file.

The foregoing and/or other features and utilities of the present general inventive concept may also be achieved by an image forming apparatus that includes an image former to perform a printing operation, a communication interface to receive printing data from the printing control apparatus, a determination unit to determine whether the received printing data are contained in an XPS file and whether the received XPS file includes PJL information or not, an extraction unit to extract the PJL information if the received XPS file includes the PJL information, and a controller to perform pre-processing of the received XPS file using the extracted PJL information.

The PJL information may be a pre-processing printing option which is performed prior to a parsing operation for the received XPS file.

The determination unit may determine whether the received XPS file includes PJL information by determining whether a header area within the received XPS file includes a pre-defined file name.

If the pre-processing for the received XPS file is completed, the controller may control the image former to perform the printing operation for the received XPS file.

The foregoing and/or other features and utilities of the present general inventive concept may also be achieved by an XPS file printing control method that includes setting a printing option for a document to be printed, determining whether the set printing option is the printing option for pre-processing and, if so, generating a setting file corresponding to the pre-processing printing option, inserting the generated setting file into the XPS file to produce a converted XPS file, and transmitting the converted XPS file to an image forming apparatus.

The image forming apparatus may receive the converted XPS file from a printing control apparatus, extract the setting file from the received XPS file, and print the received XPS file.

A printing option contained in the setting file may be applied to the received XPS file when the contents thereof are printed.

The method may further include receiving printing data, if the received printing data are contained in an XPS file, determining whether the received XPS file includes PJL information, if the received XPS file includes PJL information, extracting the PJL information, and performing pre-processing for the received XPS file using the extracted PJL information.

The foregoing and/or other features and utilities may also be achieved by a method of printing a document implemented as a compressed data structure. An existence of a pre-processing operation that is to be performed prior to printing the document extracted from the compressed data structure is determined. An operation is set to print the document in accordance with a pre-processing option defining the pre-processing operation upon a positive determination that the pre-processing operation is to be performed. The document is assembled in accordance with the compressed data structure and the assembled document is printed.

The foregoing and/or other features and utilities may also be achieved by a method of configuring a document for printing. A data structure is created to contain printing data required to print the document in accordance with printing options included in the printing data. The data structure is compressed in accordance with a predetermined data compression scheme. A setting data structure is created to contain at least one definition of a pre-processing operation that is to be performed prior to printing the printing data extracted from the compressed data structure and the setting data is inserted into the compressed data structure.

The foregoing and/or other features and utilities may also be achieved by a printing apparatus. A printing control apparatus inserts information defining a print pre-processing operation into a compressed document file containing data to assemble a document for printing. An image forming apparatus extracts the information defining the print pre-processing operation from the compressed document file prior to assembling the document for printing.

The foregoing and/or other features and utilities may also be achieved by a tangible computer-readable medium having stored thereon instructions that, when executed by a data processing machine, performs the foregoing and/or other method implementations of the present general inventive concept.

BRIEF DESCRIPTION OF THE DRAWINGS

These and/or other embodiments of the present general inventive concept will become apparent and more readily appreciated from the following description of the embodiments, taken in conjunction with the accompanying drawings of which:

FIG. 2 is a view illustrating an example of a file which is generated according to an exemplary embodiment of the present general inventive concept;

DETAILED DESCRIPTION OF THE EMBODIMENTS

Figure 1:
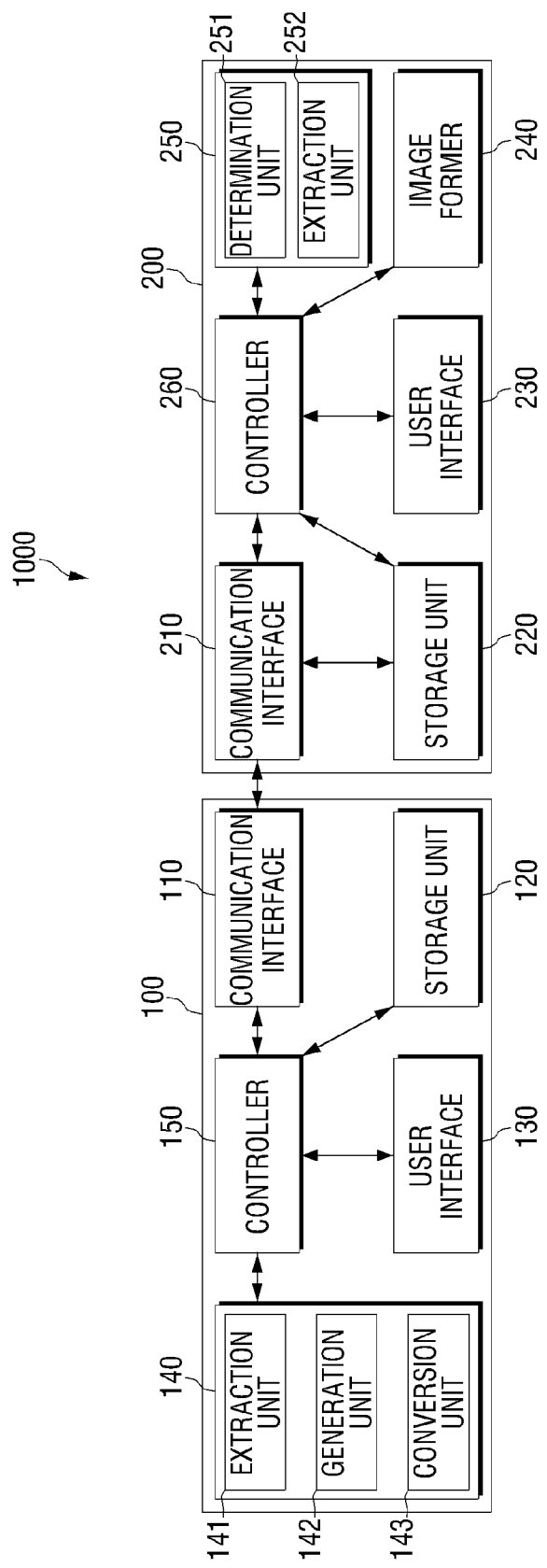
FIG. 1 is a block diagram illustrating a printing control system according to an exemplary embodiment of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures FIG. 1 is a block diagram illustrating a printing control system 1000 according to an exemplary embodiment of the present general inventive concept. Referring to FIG. 1, the printing control system 1000 includes a printing control apparatus 100 and an image forming apparatus 200.

Upon receiving a command to print a XPS file, the exemplary printing control apparatus 100 extracts a printing option from a pre-defined set of printing options available for processing the XPS file, generates a file including the extracted printing option, converts the XPS file into an enhanced XPS file by inserting the generated file into the XPS file, and transmits the converted XPS file to the image forming apparatus 200. The printing control apparatus 100 may be, among other devices, a personal computer (PC), a laptop computer, a mobile phone, or a portable multimedia player (PMP). The printing control apparatus 100 may include a communication interface 110, a storage unit 120, a user interface 130, a driver 140, and a controller 150.

The exemplary communication interface 110 is connected to the image forming apparatus 200 and transmits printing data in a format that can be processed by the image forming apparatus 200. The communication interface 110 may also transmit a printing control command to the image forming apparatus 200. The printing data may include page description language (PDL) data, which are written in printer command language (PCL) or postscript (PS), and may include XPS data. The exemplary communication interface 110 is provided to connect the printing control apparatus 100 to an external device, such as the image forming apparatus 200, and may be realized as a serial port, a universal serial bus (USB) port, a wireless port, or any other suitable data communication mechanism.

The "XPS file," as used herein, refers to a document format containing structured data in XML that defines the layout of a document and the visual appearance of each page, along with rules for distributing, archiving, rendering, processing and printing the document. The XPS file includes printing data in which, among other things such as data compression options, printing options are set at each layer and node of a multi-layered tree structure. The relationships between, among other things, the printing data, data attributes, rendering rules and printing options are determined to assemble the document for printing and can be implemented by, for example, a parsing operation of the XML data contained in the XPS file that defines such relationships. It should be readily appreciated that file formats other than that of XPS, but that have structure with similar requirements and characteristics, can be used with the present general inventive concept without deviating from the spirit and/or intended scope thereof.

The exemplary storage unit 120 stores, among other things, an XPS file, such as an XPS file that has been generated by a user using an application or that has been generated in a previous job. Also, the storage unit 120 may store an XPS file which is converted into an enhanced XPS file by one or more processes, such as those described below. The storage unit 120 may be realized as an internal storage medium in the printing control apparatus 100, an external storage medium, a removable disk including a USB memory, a web server over a network or any other suitable data storage facility.

The exemplary user interface 130 has a plurality of function keys to allow a user to set or select diverse functions supported by the printing control apparatus. Additionally, the user interface 130 may display information provided by the printing control apparatus 100. The user interface 130 may be realized as a device which performs input and output simultaneously such as a touch-sensitive display device, a device which combines a mouse and a monitor, or any other suitable human interface device. A user may select an XPS file to be output or a document to be printed using a user interface (UI) window provided by the user interface 130, and may input a command to print the XPS file or the document. Also, the user may set diverse printing options using the UI window.

The exemplary driver 140 converts the document to be printed, which is selected by the user, into an XPS file. Also, the exemplary driver 140 extracts a printing option for pre-processing from a generated XPS file, and incorporates the extracted printing option into a separate setting file. The driver 140 may then add the setting file to the XPS file. To that end, the driver 140 may include an extraction unit 141, a generation unit 142, and a conversion unit 143.

The exemplary extraction unit 141 extracts a pre-defined pre-processing printing option from the printing options set for the XPS file. The extraction unit 141 may determine whether a printing option input by the user through the user interface 130 is a pre-defined pre-processing printing option. In certain embodiments of the present general inventive concept, when the user inputs a command to print an XPS file, the extraction unit 141 checks whether the XPS file includes a pre-processing printing option and, if so, extracts the pre-processing printing option. Also, if the user sets a printing option while inputting a command to print a document, the extraction unit 141 may determine whether the set printing option is a pre-defined printing option and, if so, stores the printing option for inclusion into an enhanced XPS file, as will be described below.

The "pre-defined printing option," as used herein, refers to a pre-processing printing option to be performed prior to print processing operations such as parsing operation of the image forming apparatus 200. Exemplary pre-processing printing options include, without being limited thereto, such options as, "Banner Page Printing," to print a job information page that includes, for example, a user name and a job name prior to outputting a printing job, "Separator Output," to output a blank sheet or an separator sheet after an overhead projector (OHP) slide has been printed, "JobStore" to store printing data when printing a job, "Confirm Print," to print remaining pages upon receipt of confirmation from a user, such as after printing only one page of printing data, "Secure Print," to print only when a correct password is input, "Private JobStore," to store printing data without outputting printed matter corresponding to a printing job, which may include a requirement for a user to enter a password, "Common JobStore," to store printing data without outputting printed matter corresponding to the printing job, and "Reserve Print," to perform a printing job at a reserved time.

The exemplary generation unit 142 generates a setting file corresponding to the pre-processing printing option. More specifically, the generation unit 142 generates a setting file, such as the setting file 290 illustrated in FIG. 2, to include the pre-processing printing option extracted by the extraction unit 141. The generation unit 142 may assign a pre-defined file name (for example, 'Control.PJL') to the generated setting file, and may convert the extracted pre-processing printing option into a PJL command format, such as is illustrated in FIG. 2. The generated setting file may then incorporate the converted PJL command.

If the XPS file includes a previously generated setting file, the generation unit 142 may change the previously generated setting file to include the pre-processing printing option extracted by the extraction unit 141.

The exemplary conversion unit 143 converts the XPS file to an enhanced XPS file by adding the generated setting file to the XPS file. The detailed operation of the conversion unit 143 is explained with reference to FIG. 3.

Figure 3:
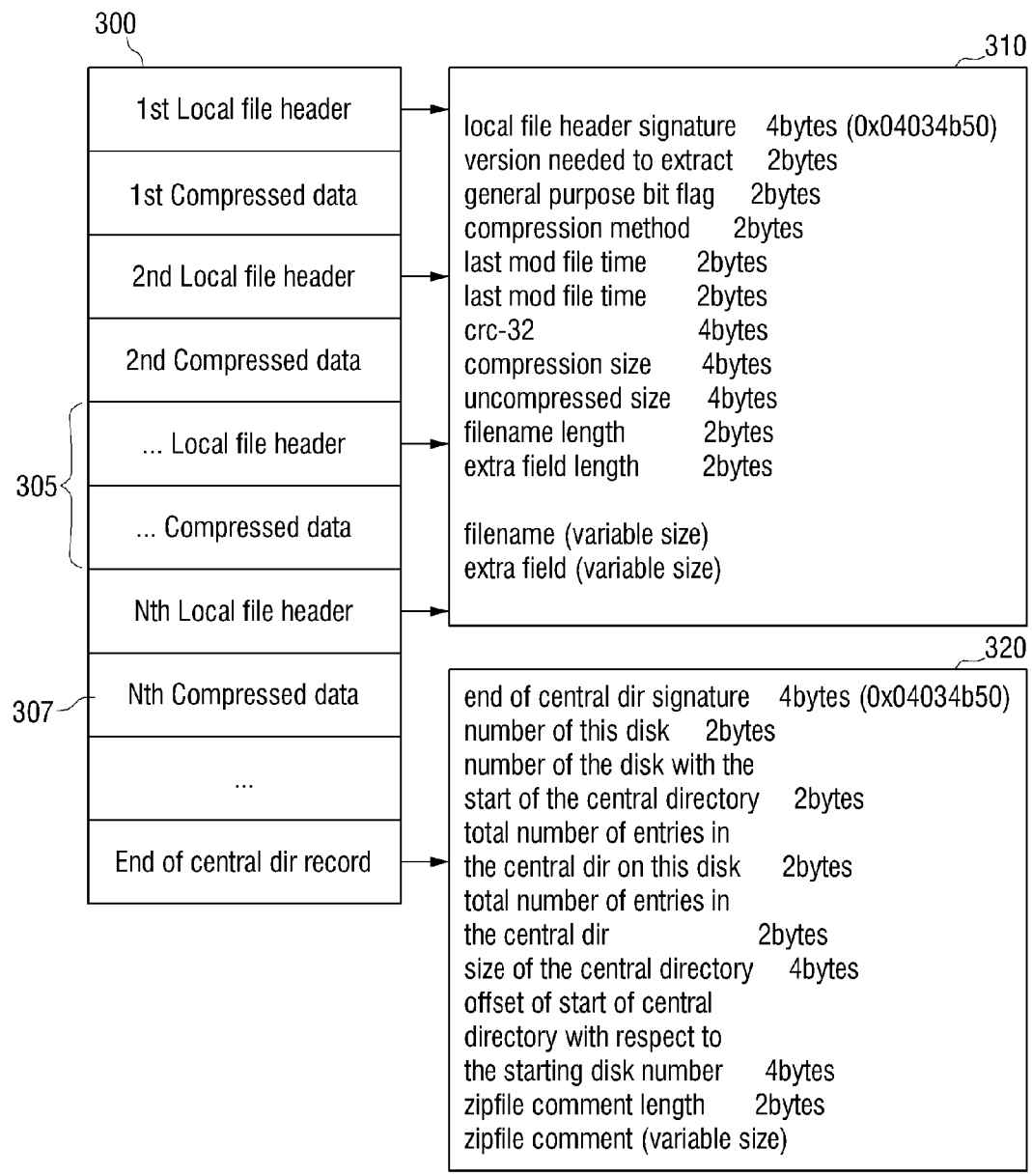
FIG. 3 illustrates a structure of a ZIP file.

FIG. 3 is a conceptual illustration of a structure of a ZIP file.

As described above, the XPS file is a compressed file in which XML data describing relationships between resources are combined with the resources themselves in a ZIP format. Accordingly the XPS file has a ZIP structure as illustrated in FIG. 3. The ordinarily skilled artisan will readily appreciate that while the ZIP format is described herein, other file compression schemes can be used with the present general inventive concept without deviating from the spirit and/or intended scope thereof. The ZIP format is described here in part because of its association with the XPS file standard, itself being described herein only to exemplify the applicability of the present general inventive concept. Accordingly, it is to be understood that the description of the ZIP format, as well as the XPS format, is not intended to imply any limitation of the present general inventive concept.

Referring to FIG. 3, a ZIP file 300 includes a plurality of data areas, an exemplary one of which is illustrated and data area 307, and a header area 310 corresponding to each of the data areas. The data area 307 stores actual data and the header area 310 stores descriptive and/or informative data such as a file name of the data stored in the corresponding data area 307, and compression information corresponding to the data. One data area 307 and one header area 310 constitute one local file, such as is illustrated at local file 305. The data area 307 of a local file 305 may be compressed or uncompressed independently of the compression state of data areas 307 in other local files 305 according to a setting for each local file 305.

The ZIP file may have added thereto a data file by inserting the header area 310 and the data area 307 corresponding to the file to be added between the local files previously stored in the ZIP file, and correcting the "end of central dir record" area 320.

Accordingly, the exemplary conversion unit 143 generates a header area 310 corresponding to the setting file generated by the generation unit 142, and adds the header area and the setting file to the XPS file, thereby converting the XPS file into an enhanced XPS file.

The conversion unit 143 may insert the file generated by the generation unit 142 into a predetermined data range of the XPS file. The "predetermined data range," as used herein, refers to a data area in the XPS file that is accessed in a predetermined time interval, such as the onset of XPS file processing in the image forming apparatus. For example, if the predetermined data range is a first local file range of the ZIP file, the conversion unit 143 inserts the header data and the data corresponding to the file generated by the generation unit 142 into the areas "1$^{st}$ local file header" and "1$^{st}$ compressed data", respectively. Any existing local file is shifted to the next local file area in the local file sequence. By inserting the generated file at the beginning portion of the enhanced XPS file, the image forming apparatus 200 can efficiently retrieve the pre-processing printing option.

Also, the conversion unit 143 may insert the generated setting file into the XPS file in an uncompressed state so that the image forming apparatus 200 can rapidly extract the added setting file.

The exemplary controller 150 controls the interoperation of the components of the printing control apparatus 100. For example, the controller 150 may control the communication interface 110 to transmit the enhanced XPS file generated by the driver unit 140 to the image forming apparatus 200. Also, the controller 150 may store the enhanced XPS file in the storage unit 120 to, among other things, make the enhanced XPS file available for reuse. The controller 150 may store the enhanced XPS file under a different name or may overwrite an existing XPS file. This operation may be performed according to user's selection or may be automatically performed without an extra user command.

The controller 150 may change the setting file within the enhanced XPS file. For example, the enhanced XPS file may be retrieved from the storage unit 120 so that the user can perform a printing operation in accordance with settings and data therein. Upon receipt of a command to print the stored enhanced XPS file, the controller 150 may control the user interface 130 to display to the user the contents of the previously generated setting file 290 and, if a new printing option is received from the user, the controller 150 may control the driver 140 to update the setting file. The updated setting file may be saved in the enhanced XPS file and stored in the storage unit 120 as described above.

The exemplary image forming apparatus 200 performs printing operations according to received printing job data. The image forming apparatus 200 may be, among other things, a copier, a printer, a facsimile machine or a multifunction peripheral that incorporates the functions of the aforementioned devices into a single device. The image forming apparatus 200 may include a communication interface 210, a storage unit 220, a user interface 230, an image former 240, an emulator 250, and a controller 260.

The exemplary communication interface 210 is connected to the printing control apparatus 100 and receives an XPS file therefrom. The communication interface 210 may connect the image forming apparatus 200 to the printing control apparatus 100 through a local area network (LAN), the Internet, or through a universal serial bus (USB) port. Additionally, the image forming apparatus 200 may receive an XPS file in a direct-printing manner, such as through a dedicated printer port.

The exemplary storage unit 220 stores the XPS file received through the communication interface 210. The storage unit 220 may be an internal storage medium, such as solid state memory or a disk drive, or may be an external storage medium which is not embedded in the image forming apparatus 200, such as, for example, a USB memory which is connected to an exterior port of the image forming apparatus 200.

The exemplary user interface 230 has a plurality of function keys to allow a user to set or select diverse functions supported by the image forming apparatus 200, and displays information provided by the image forming apparatus 200. The user interface 230 may be realized as a device which performs input and output simultaneously such as a touch-sensitive display, or a one or more human interface devices, such as a combination of a mouse and a monitor. The user may select parameters defining a printing process for the XPS file received through the communication interface 210, using a UI window provided by the user interface 230. For example, if a password is set in the XPS file received through the communication interface 210, the user may enter the password through the UI window and when the correct password is entered, the image forming apparatus 200 performs a printing job with the received XPS file.

The exemplary image former 240 performs printing operations. More specifically, the image former 240 outputs printing data which are processed by the emulator 250, as will be described below.

The exemplary emulator 250 includes an XPS emulator to perform printing operations corresponding to an XPS file and a PDL emulator to perform printing operations corresponding to PDL data. The exemplary emulator 250 performs parsing and rendering of the printing data received through the communication interface 210. If the received XPS file includes PJL information, the emulator 250 extracts the PJL information. To do so, the emulator 250 may include a determination unit 251 and an extraction unit 252.

The exemplary determination unit 251 determines whether received printing data are contained in an XPS file by checking whether the received printing data are in a compressed file or whether the received printing data includes a setting file.

Also, the determination unit 251 may determine whether the received XPS file includes PJL information by checking whether the XPS file received through the communication interface 210 includes a setting file having a pre-defined file name. For example, if the printing control apparatus 200 generates a file including a pre-defined printing option using the name 'Control.PJL', the determination unit 251 may sequentially examines the header area within the XPS file to determine whether the file within the header area has the file name 'Control.PJL'.

If the received XPS file includes PJL information, the exemplary extraction unit 252 extracts the PJL information. For example, the extraction unit 252 may extract the file having a pre-defined file name (for example, 'Control.PJL') from the XPS file according to the information determined by the determination unit 251. If the file is compressed, the extraction unit 252 may perform decompression of a data area where the PJL information is stored. Also, if the extracted information in the setting file includes a command other than a PJL command, the extraction unit 252 may convert the command into the PJL command. For example, if the printing control apparatus 100 generates a setting file without converting a pre-processing printing option into a PJL command and adds the setting file to the XPS file, the extraction unit 252 extracts the setting file from the XPS file and converts the pre-processing printing option within the setting file into a PJL command.

The exemplary controller 260 controls the functions and interoperations of the image forming apparatus 200. Additionally, the controller 260 may perform pre-processing operations on the XPS file using the PJL information extracted by the extraction unit 252.

For example, if the PJL information extracted by the extraction unit 252 includes the information in the exemplary setting file 290 illustrated in FIG. 2, the controller 260 controls the user interface 230 to prompt for and receive a password from the user, and controls the storage unit 220 to store the XPS file if the received password is identical to the password set in the XPS file.

Also, if the pre-processing operation for the XPS file is completed, the controller 260 controls the image former 240 to perform a printing job in accordance with the contents of the XPS file. For example, if the PJL information extracted by the extraction unit 252 indicates the option "Reserve Print", the controller 260 controls the storage unit 220 to store the received XPS file, that is, to perform pre-processing operation, and performs a printing job of the contents of the XPS file at a reserved time.

Accordingly, the image forming apparatus 200 can easily perform the pre-processing operation with respect to the XPS file.

In FIG. 1, the driver 140 may be realized as an XPS printer driver performing a series of operations with respect to an XPS file, and the extraction unit 141, the generation unit 142, and the conversion unit 143 of the driver 140, described above, may be realized as a single filter located within an XPS printer filter pipeline path.

Figure 4:
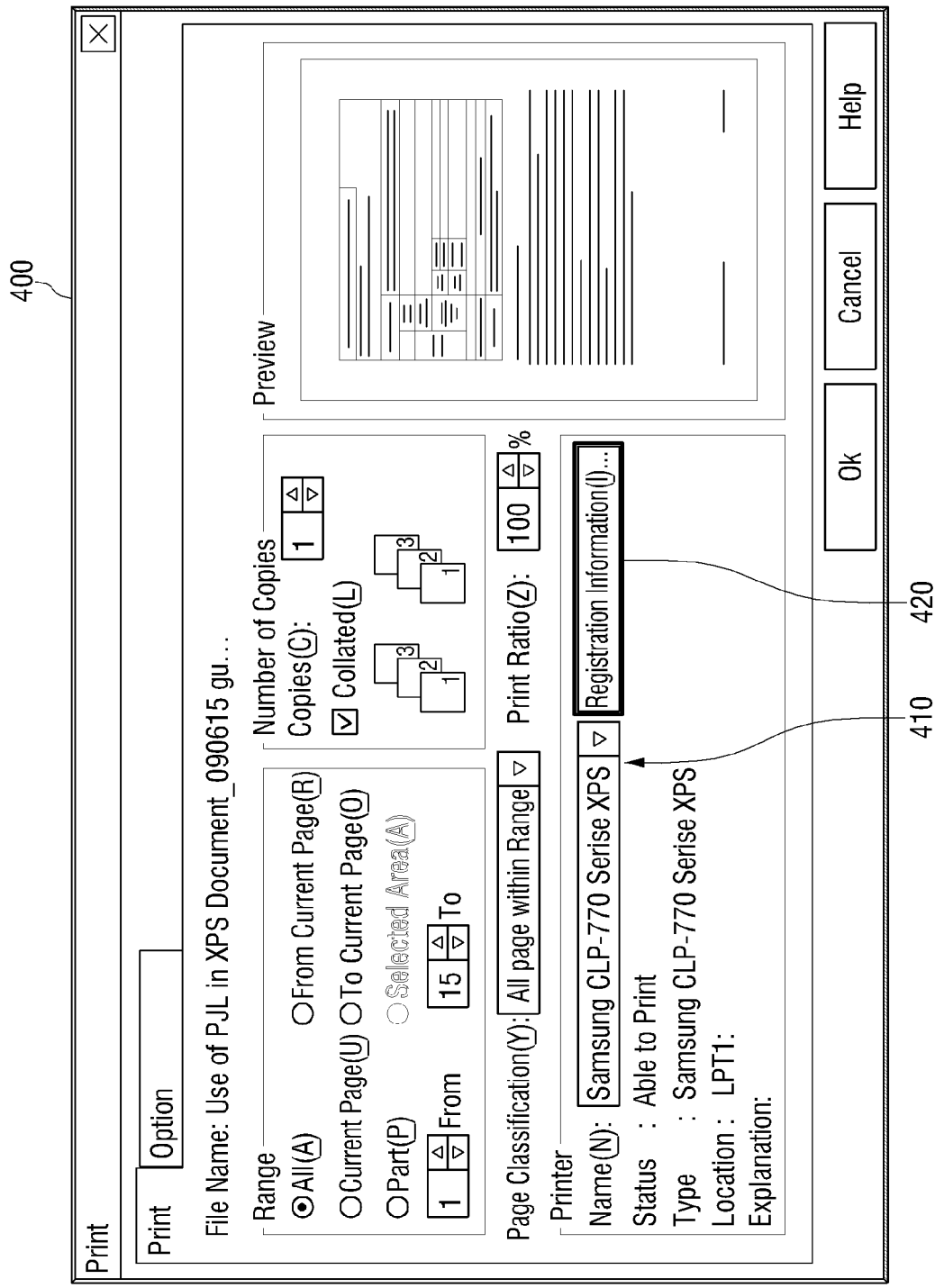
FIGS. 4 to 6 are views illustrating diverse examples of a user interface (UI) window of the image forming apparatus according to an exemplary embodiment of the present general inventive concept.
Figure 5:
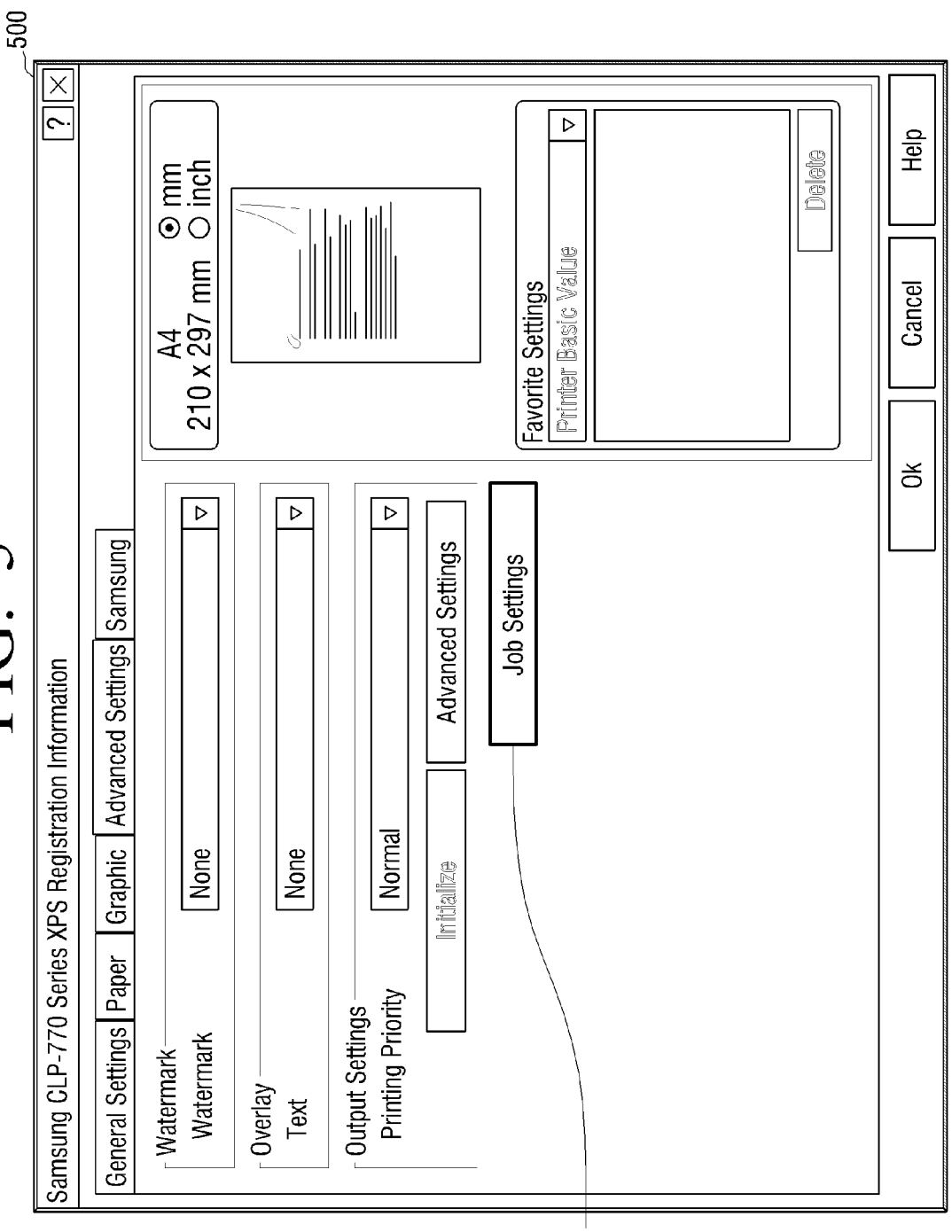
Figure 6:
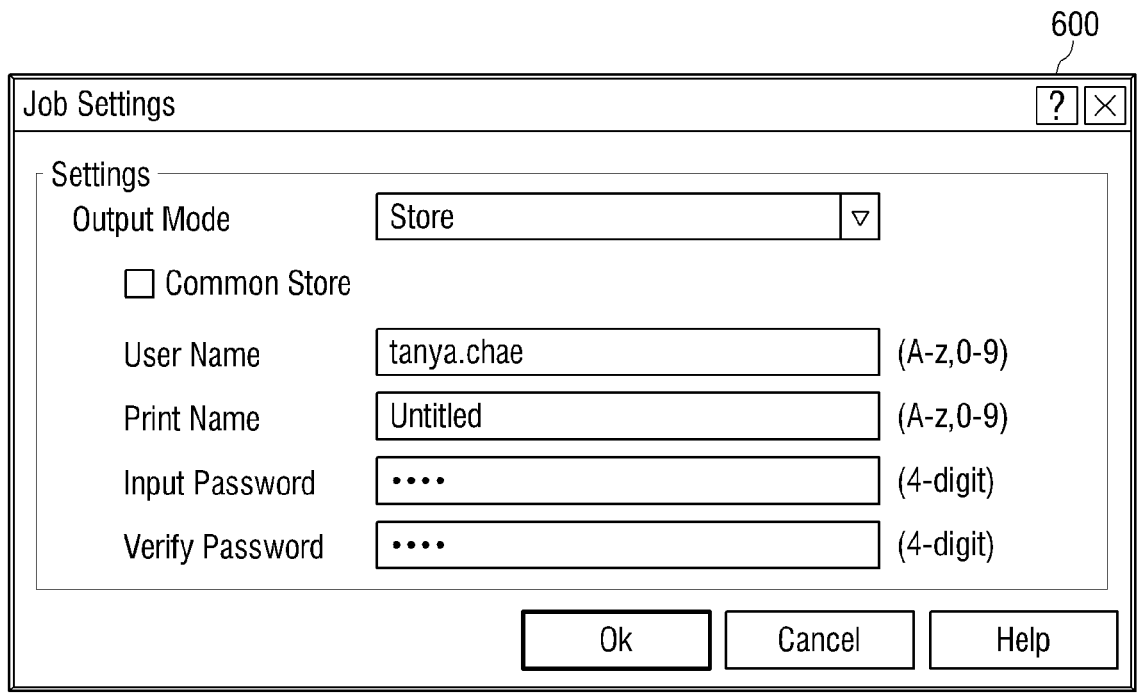

FIGS. 4 to 6 are views illustrating examples of various exemplary UI windows that may be used in conjunction with an image forming apparatus suitable to practice the present general inventive concept.

FIG. 4 illustrates an example of a UI window 400 which is displayed to receive a command to print a document produced by an application. As is illustrated in FIG. 4, a user may select an XPS file through drop-down control 410 to output the document in accordance with the XPS conventions. The user may select 'Registration Information' 420 through the data entry control 420 to set diverse printing options regarding the generated XPS file.

FIG. 5 illustrates an example of a UI window 500 which is displayed when the user selects the 'Registration Information' option through control 420. Referring to FIG. 5, the user may set diverse printing options, such as, for example, watermarks, overlay text and printing priority for the XPS file. The user may set the printing options regarding pre-processing operation by selecting the "Job Settings" button control 510.

FIG. 6 illustrates an example of a UI window 600 which is displayed when the user selects the "Job Settings" control 510 on the UI window 500 of FIG. 5. As is illustrated in FIG. 6, the user may set diverse pre-processing options per user preferences. If the user sets a printing option for pre-processing, the printing control apparatus 100 may generate an XPS file that includes an additional file containing the pre-processing information through, for example, the above-described operations.

Figure 7:
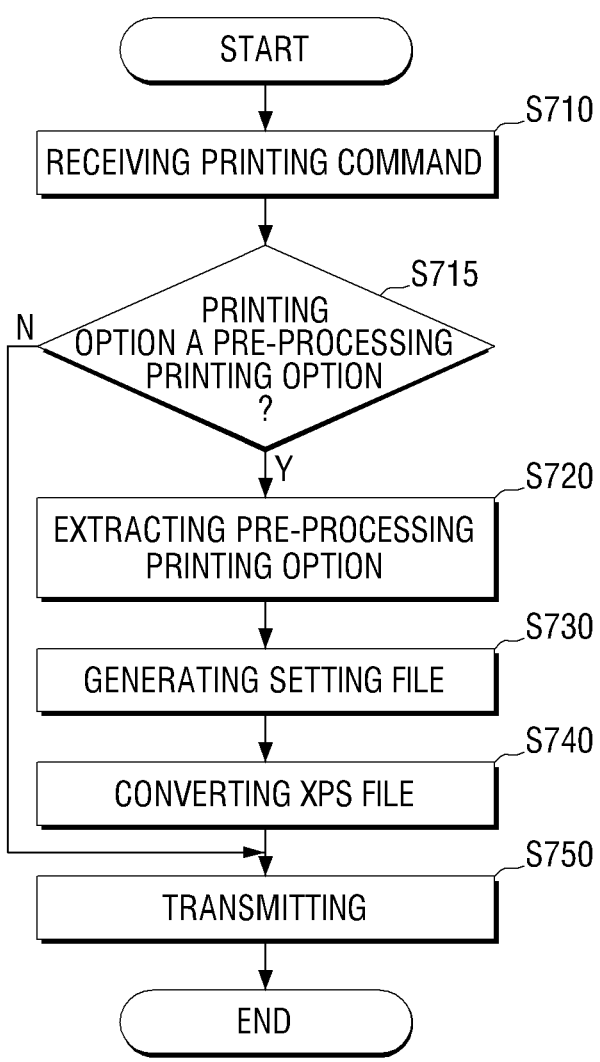
FIGS. 7 and 8 are flowcharts illustrating a printing control method according to an exemplary embodiment of the present general inventive concept.

FIG. 7 is a flowchart illustrating an exemplary printing control method of the printing control apparatus 100 according to an exemplary embodiment of the present general inventive concept.

If a command to print an XPS file is received or if a printing option for a document to be printed via an XPS file is set (S710), it is determined (S715) whether the printing option set by the user is a printing option for pre-processing, or whether the printing option set in the XPS file includes a pre-defined printing option for pre-processing. If the printing option is a pre-processing option as determined in operation S715, the pre-processing printing option selected by the user or the pre-processing printing option set in the XPS file is extracted (S720). For example, if it is determined that the printing option set in the XPS file includes a pre-defined printing option, and if the pre-defined printing option is set in the XPS file, the pre-defined printing option is extracted from the XPS file. The pre-defined printing option may be, for example, a pre-processing printing option that is to be performed prior to the parsing operation of the XPS file conducted in the image forming apparatus 200. If it is determined in operation S715 that the printing option is not a pre-processing option, the printing control apparatus 100 may transmit the XPS file to the image forming apparatus 200 without change (S750).

A setting file including the extracted printing option is generated (S730). The extracted pre-processing printing option may be generated as a single setting file. The generated setting file may have a pre-defined file name (for example, 'Control.PJL'). Also, the extracted pre-processing printing option may be converted into PJL commands as illustrated in the exemplary setting file 290 in FIG. 2, and included in the setting file 290.

Also, the XPS file is converted to an enhanced XPS file by adding the generated setting file to the XPS file (S740). More specifically, a header area corresponding to the setting file may be generated, and the enhanced XPS file is created by adding the generated header area and the setting file to the XPS file. The added header area and the setting file may be located within a predetermined data range of the XPS file. Additionally, the added setting file may be added to the XPS file in an uncompressed state.

The converted XPS file may be transmitted to the image forming apparatus 200 (S750). The converted XPS file may be stored at the printing control apparatus 100 or in an external storage medium. More specifically, since the XPS file can be repeatedly output, the enhanced XPS file may be stored for reuse. The enhanced XPS file may be stored using a different file name or may be overwritten to an already stored XPS file. This operation may be performed according to a user's selection or may be automatically performed without a user's command.

The setting file within the enhanced XPS file may be changed. For example, the enhanced XPS file may be stored as described above and the stored XPS file may be printed according to a different printing option. Accordingly, if a command to print the stored XPS file is input, the contents regarding the already generated setting file is displayed for the user. Then, if a new printing option is input by the user, the setting file may be updated and stored, per the user's preferences.

Figure 8:
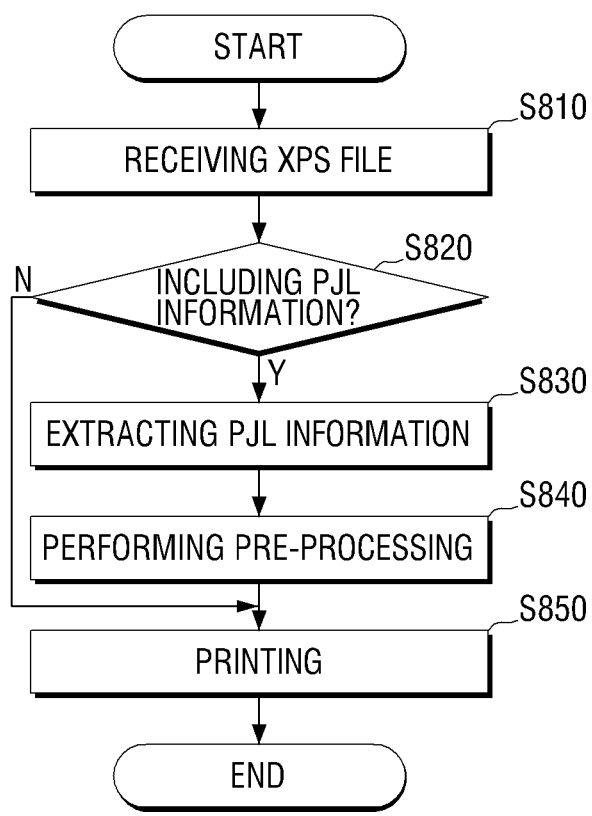

FIG. 8 is a flowchart illustrating an exemplary printing control method of the image forming apparatus 200 according to an exemplary embodiment of the present general inventive concept.

If an XPS file is received from the printing control apparatus 100 (S810), it is determined (S820) whether the XPS file includes PJL information. For example, it may be determined whether the XPS file includes PJL information by examining a header area of the XPS file and checking whether the header area includes a file having a pre-defined file name. The operation S810 may be preceded by an operation of determining whether printing data received from the printing control apparatus 100 is an XPS file by checking whether the received printing data are a compressed file or whether the received printing data includes a setting file.

If the XPS file does not include PJL information, decompressing, parsing, and rendering are performed on the contents of the XPS file and a printing job is performed (S850).

On the other hand, if the XPS file includes PJL information, the PJL information is extracted (S830). More specifically, a file having a pre-defined file name (for example, 'Control.PJL) is extracted from the XPS file based on the information determined in operation S820. If the file is compressed, decompressing may be performed on a data area where the PJL information is stored.

Pre-processing for the XPS file is performed in accordance with the PJL information (S840).

According to the printing control method described above, since a printing option necessary for pre-processing is transmitted to the image forming apparatus 200 as a file included in the enhanced XPS file, the pre-processing at the image forming apparatus can be efficiently undertaken. The exemplary printing control method of FIG. 7 may be executed by the printing control apparatus 100 having the configuration of FIG. 1 or may be executed by any other suitable type of printing control apparatus. Also, the printing control method of FIG. 8 may be executed by the image forming apparatus 200 having the configuration of FIG. 1 and may be executed by any other suitable type of image forming apparatus.

Certain embodiments of the present invention provide for functional components thereof to be manufactured, transported, marketed and/or sold as machine instructions encoded on machine-readable media. The present general inventive concept, when so embodied, can be practiced regardless of the processing platform on which the machine instructions are executed and regardless of the manner by which the machine instructions are encoded on the machine-readable medium.

It is to be understood that the machine-readable medium discussed in the paragraph above may be any medium on which the instructions may be encoded and then subsequently retrieved, decoded and executed by a processor, including electrical, magnetic and optical storage devices, and wired, wireless, optical and acoustical communication channels. The machine-readable medium may be a computer-readable medium that includes either or both of persistent storage, referred to herein as "computer-readable recording media" and as spatiotemporal storage, referred to herein as "computer-readable transmission media". Examples of computer-readable recording media include, but not limited to, read-only memory (ROM), random-access memory (RAM), and other electrical storage; CD-ROM, DVD, and other optical storage; and magnetic tape, floppy disks, hard disks and other magnetic storage. The computer-readable recording media may be distributed across components, to include such distribution through storage systems interconnected through a communication network. The computer-readable transmission media may transmit encoded instructions on electromagnetic carrier waves or signals, or as acoustic signals through acoustically transmissive media. Moreover, the processor instructions may be derived from algorithmic constructions of the present general inventive concept in various programming languages, the mere contemplation of which illustrates the numerous realizable abstractions of the present general inventive concept.

Although various example embodiments of the present general inventive concept have been illustrated and described, it will be appreciated by those skilled in the art that changes may be made in these example embodiments without departing from the principles and spirit of the general inventive concept, the scope of which is defined in the appended claims and their equivalents.

What is claimed is:

1. A printing control apparatus which is connected to an image forming apparatus, the printing control apparatus comprising:
   a user interface to set a printing option for a document of an extensible markup language paper specification (XPS) file to be printed;
   an extraction unit to determine whether the set printing option is a printing option for pre-processing,
   wherein the pre-processing printing option is at least one of printing options "Banner Page Printing", "Separator Print", "JobStore", "Confirm Print", "Secure Print", "Private JobStore", "Common JobStore", and "Reserve Print";
   a generation unit to generate a setting file containing the printing option if the printing option is the pre-processing printing option;
   a conversion unit to convert the XPS file to include the generated setting file; and
   a controller to transmit the converted XPS file to the image forming apparatus,
   wherein the pre-processing printing option is performed by the image forming apparatus prior to a parsing operation for the XPS file.

2. The printing control apparatus as claimed in claim 1, wherein the image forming apparatus receives the converted XPS file from the printing control apparatus, retrieves the setting file from the converted XPS file, and prints the XPS file.

3. The printing control apparatus as claimed in claim 2, wherein the image forming apparatus applies the printing option contained in the setting file to the contents of the XPS file and prints the XPS file.

4. The printing control apparatus as claimed in claim 1, wherein the converted XPS file is a compressed file and the setting file is located within the converted XPS file.

5. The printing control apparatus as claimed in claim 1, wherein the setting file includes a printer job language command.

6. The printing control apparatus as claimed in claim 1, wherein the controller changes the setting file within the converted XPS file.

7. An image forming apparatus which is connected to a printing control apparatus, the image forming apparatus comprising:
   an image former to perform a printing operation;
   a communication interface to receive printing data from the printing control apparatus;
   a determination unit to determine whether the received printing data comprises a setting file consisting of one or more pre-processing printing options added to an extensible markup language paper specification (XPS) file,
   wherein the one or more pre-processing printing options is/are at least one of printing options "Banner Page Printing", "Separator Print", "JobStore", "Confirm Print", "Secure Print", "Private JobStore", "Common JobStore", and "Reserve Print";
   an extraction unit to extract the setting file from the XPS file, if the received XPS file includes the setting file, and convert the one or more pre-processing printing options within the setting file into a printer job language (PJL) command; and
   a controller to perform pre-processing of the received XPS file using the extracted PJL command,
   wherein the pre-processing printing option is performed by the image forming apparatus prior to a parsing operation for the XPS file.

8. The image forming apparatus as claimed in claim 7, wherein the PJL command is a pre-processing printing option which is performed prior to a parsing operation for the received XPS file.

9. The image forming apparatus as claimed in claim 7, wherein the determination unit determines whether the received XPS file includes PJL information by determining whether a header area within the received XPS file includes a pre-defined file name.

10. The image forming apparatus as claimed in claim 7, wherein, if the pre-processing for the received XPS file is completed, the controller controls the image former to perform the printing operation for the received XPS file.

11. An extensible markup language paper specification (XPS) file printing control method, comprising:
setting a printing option for a document to be printed;
determining whether the set printing option is a printing option for pre-processing,
wherein the pre-processing printing option is at least one of printing options "Banner Page Printing", "Separator Print", "JobStore", "Confirm Print", "Secure Print", "Private JobStore", "Common JobStore", and "Reserve Print";
if the printing option is the printing option for pre-processing, generating a setting file containing the pre-processing printing option;
inserting the generated setting file into an XPS file to produce a converted XPS file; and
transmitting the converted XPS file to an image forming apparatus,
wherein the pre-processing printing option is performed by the image forming apparatus prior to a parsing operation for the received XPS file.

12. The method as claimed in claim 11, including:
receiving at the image forming apparatus the converted XPS file from a printing control apparatus;
extracting the setting file from the received XPS file; and
printing contents of the received XPS file.

13. The method as claimed in claim 12, wherein the printing option contained in the setting file is applied to the received XPS file when the contents thereof are printed.

14. The method as claimed in claim 11, wherein the received XPS file is a compressed file and the setting file is located within the received XPS file.

15. The method as claimed in claim 11, wherein the setting file includes a printer job language (PJL) command.

16. The method as claimed in claim 11, further comprising changing the setting file within the converted XPS file.

17. The method as claimed in claim 12, further comprising:
receiving printing data;
if the received printing data are contained in an XPS file, determining whether the received XPS file includes printer job language (PJL) information;
if the received XPS file includes PJL information, extracting the PJL information; and
performing pre-processing for the received XPS file using the extracted PJL information.

18. The method as claimed in claim 17, wherein the PJL information is a pre-processing printing option which is performed prior to a parsing operation for the received XPS file.

19. The method as claimed in claim 17, wherein the determining determines whether received XPS file includes PJL information by determining whether a header area within the received XPS file includes a pre-defined file name.

20. The method as claimed in claim 17, further comprising, if the pre-processing for the received XPS file is completed, performing a printing job for the received XPS file.

* * * * *